United States Patent [19]

Schmidt

[11] 4,088,943

[45] May 9, 1978

[54] BRUSHLESS DC TACHOMETER CIRCUIT

[75] Inventor: Robert H. Schmidt, Minnetonka, Minn.

[73] Assignee: Electro-Craft Corporation, Hopkins, Minn.

[21] Appl. No.: 772,028

[22] Filed: Feb. 25, 1977

[51] Int. Cl.² ............................................. H02P 9/00
[52] U.S. Cl. ..................................... 322/90; 307/304; 318/138; 322/94; 324/163
[58] Field of Search .................. 322/7, 8, 30, 31, 89, 322/90, 94; 318/138, 254, 326–328; 310/68 B; 361/236; 324/163, 164, 168, 169; 307/279, 304; 363/87, 129

[56] References Cited

U.S. PATENT DOCUMENTS

| 3,508,137 | 4/1970 | Hill | 322/8 X |
| 3,603,869 | 9/1971 | Neuffer et al. | 322/90 X |

Primary Examiner—Robert J. Hickey
Attorney, Agent, or Firm—Schroeder, Siegfried, Ryan, Vidas & Steffey

[57] ABSTRACT

A brushless tachometer utilizing four stator windings and series connected field effect transistor commutation switches to provide an input to a summing amplifier. Connection of the field effect transistor switches to the summing junction of the amplifier and use of series resistance and back-to-back clamping diodes on the winding side of the field effect transistors permits commutation switching with a minimum of transient voltage changes due to interruption of the stator winding current.

6 Claims, 5 Drawing Figures

BRUSHLESS DC TACHOMETER CIRCUIT

This invention relates to brushless DC tachometers in general and more particularly relates to a tachometer construction utilizing series connected field effect transistors as switching elements.

Prior art brushless DC tachometers generally utilize semiconductor switching elements to rectify AC voltage induced in the tachometer windings of a brushless tachometer. Such prior art devices generally require the use of additional circuitry to suppress transient voltages induced in the stator windings during commutation by the switching of the semiconductor commutation elements between ground and the input to the summing amplifier. These previous brushless tachometers may be characterized as relying upon voltage switching techniques for the commutation of the tachometer AC voltage. The prior art devices have also utilized field effect transistors for commutation purposes because of their low "on" resistance and high "off" resistance and absence of an inherent offset voltage which would otherwise introduce a nonlinearity in their response at low voltages.

Since analog tachometers are often required to produce DC output voltages of a magnitude as large as 100 volts or more, commutation by the voltage switching techniques of the prior art soon becomes unwieldy due to the unavailability of field effect transistors suitable for handling the switching of 100 volts or more and the requirement that a plus or minus 100 volt source is necessary to drive the gates of the field effect transistors to turn them on or off. The prior art direct voltage switching technique for commutation also introduces high voltage switching transients since current flowing in the inductive stator windings is necessarily interrupted during switching. With tachometers employing this prior art method of switching, high voltage rated components must be used throughout the entirety of the switching system.

In contrast to the prior art systems, my invention, which performs the commutation of brushless tachometer windings utilizing current switching into the summing junction of an operational amplifier provides improved performance and avoids the use of high voltage rated components throughout the system. The FET switches are protected from excessive voltage by the use of series resistors and back-to-back clamping diodes on the winding side of the switches. The other side of the FET switches is directly connected to deliver current to the summing junction of the operational amplifier which is at virtual ground.

The use of the clamping diode on the winding side of the field effect transistors ensures a continuous path for the winding current and eliminates high voltage switching transients caused by rapid changes in the winding current introduced during commutation. The winding current of the present invention is relatively constant and passes through the clamping diodes to ground when the associated field effect transistor switch is off or passes through the field effect transistor to the virtual ground at the summing junction when the field effect transistor is on. Thus, the winding current is never completely interrupted during commutation and no high voltage switching transients are induced.

Accordingly, the primary object of the present invention is to provide a novel brushless DC tachometer utilizing relatively inexpensive components and which combines improved linearity and accuracy with a minimum of circuit transients.

A further object of the present invention is to provide a novel brushless DC tachometer utilizing low voltage field effect transistors in a current switching rather than a voltage switching mode.

A still further object of the present invention is to provide a novel brushless tachometer utilizing an operational amplifier driven by a voltage source of substantially lesser magnitude than the DC voltages which are normally produced by the tachometer windings.

These as well as other objects of this invention will become readily apparent after reading of the following description of the accompanying drawings in which.

Figure 1:
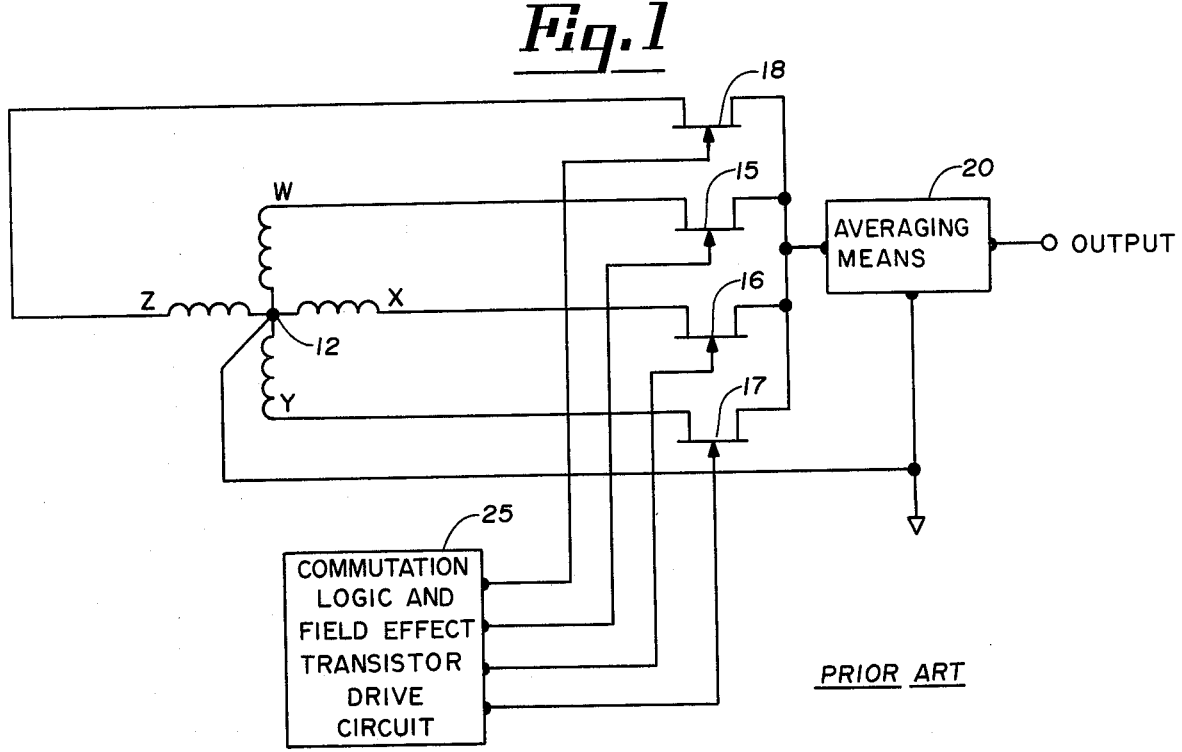
FIG. 1 is a simplified block diagram of the direct voltage switching commutation tachometer circuits known in the prior art.

Referring now to the prior art tachometer of FIG. 1, there is shown a series of four brushless tachometer windings W, X, Y, and Z which are positioned to be cut by a rotating magnetic flux field in the air gap of the tachometer and to generate an induced voltage having a magnitude directly proportional to the rotational speed of the armature shaft. The windings shown are star connected to a common point 12 and then to ground. The other end of windings W, X, Y, and Z are connected respectively through field effect transistors 15, 16, 17, and 18 to a suitable averaging means 20 which may be either a low pass filter or an operational amplifier. Field effect transistors 15, 16, 17, and 18 have their gate terminals connected to a commutation logic and field effect transistor drive circuit 25 which sequentially energizes one of the group of four field effect transistors to couple the winding voltage to averaging circuit 20. A separate commutation means connected to the rotating shaft of the tachometer is used to generate the drive signal used to enable the proper field effect transistor to couple the appropriate winding to the averaging circuit 20 during that portion of the tachometer shaft rotation when the winding is receiving a voltage proportional to the rate of rotation of the tachometer.

In the prior art circuit shown in FIG. 1, each of the field effect transistors 15, 16, 17, and 18 must be capable of switching the voltage produced by its associated tachometer winding. Since many tachometer windings will produce as much as 100 volts DC during normal operation, use of field effect transistors capable of switching that magnitude of voltage may be necessary. Furthermore, the components of any amplifier which may be included in the low pass filter or operational amplifier block 20 must also be capable of handling such relatively high DC voltages. Operation of field effect transistor switches 15, 16, 17, and 18 also causes transient voltages to be developed across the windings W, X, Y, and Z because of the fact that a current is conducted from the windings during the time when the field effect transistor is turned on and no current is being drawn from the windings during the period of time when it is turned off. The relatively rapid turnoff of the field effect transistors and the inductance of the tachometer windings cooperate to cause large transient voltages to be induced.

Figure 2:
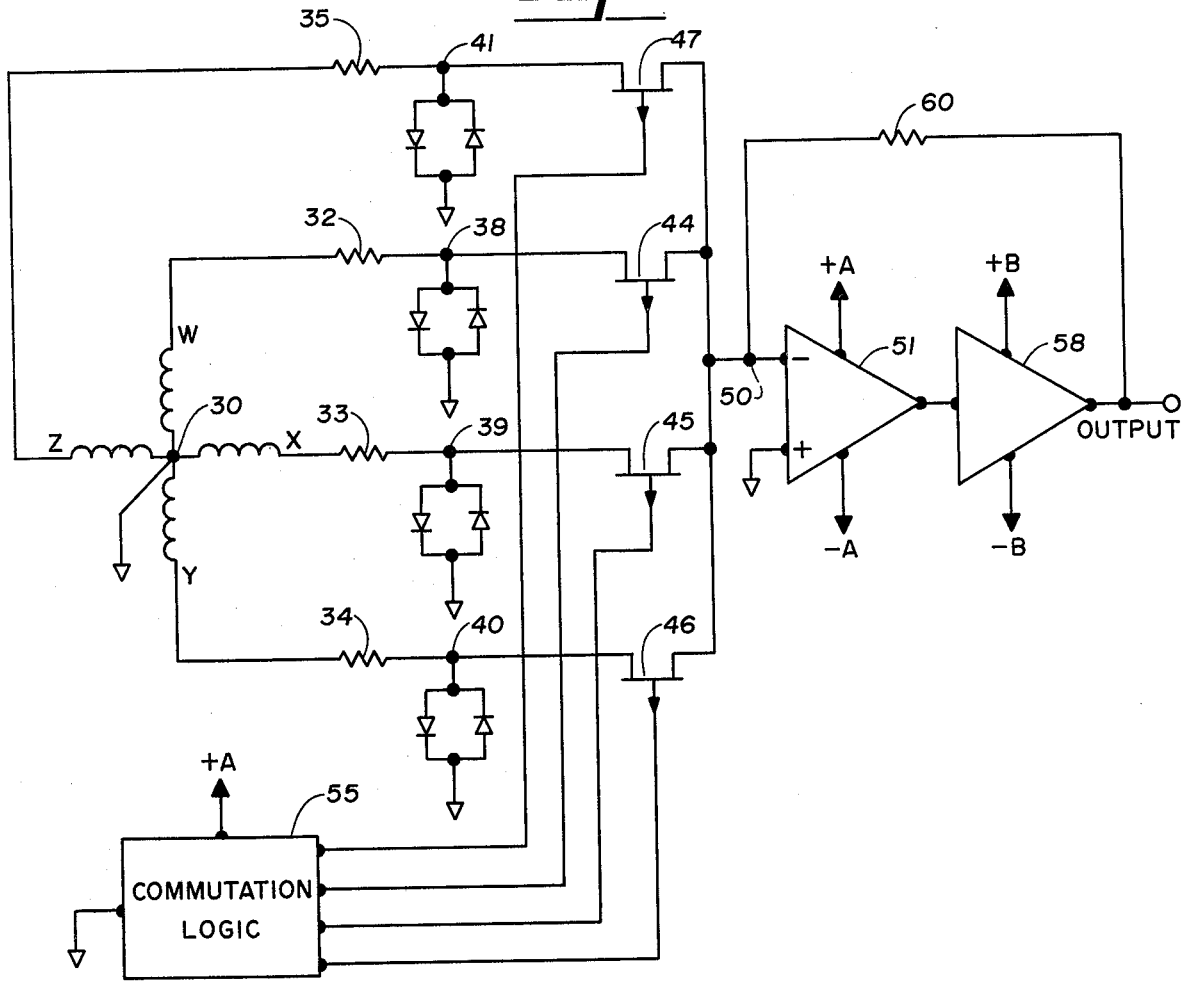
FIG. 2 is a simplified schematic of a brushless DC tachometer constructed in accordance with the teachings of the present invention.

Referring now to FIG. 2, tachometer windings W, X, Y, and Z each have one end connected to grounded terminal 30. The other ends of the windings are connected through resistors 32, 33, 34, and 35 respectively to nodes 38, 39, 40, and 41. Each of nodes 38, 39, 40, and 41 is connected to ground through a parallel pair of back-to-back diodes and is also connected through one of field effect transistors 44, 45, 46, and 47 to summing junction 50 of an operational amplifier 51.

When field effect transistor 44, for example, is in the nonconductive mode, induced current from winding W passes through resistor 32 through node 38 through one of the two back-to-back diodes to ground. When field effect transistor 44 is switched to a conductive condition, the current passes through resistor 32 and node 38 through field effect transistor 44 which has a low forward voltage drop to summing junction 50 which is at virtual ground and no current passes through the back-to-back diode because the voltage is insufficient to exceed the offset voltage inherent to the diode. When field effect transistor 44 is turned off, the current flowing through node 38 flows again to ground through the back-to-back diodes. The turning on and turning off of field effect transistor 44 causes only a relatively minor variation in the flow of current from winding W so that no inductive voltage transient results.

The operation of field effect transistors 44, 45, 46, and 47 is controlled by commutation logic 55 shown in block diagram form only.

A number of commutation circuits are known to the prior art for providing gating commands to one of a series of commutation switches. Typically, such commutation logic circuits receive a position encoder signal from the shaft of the tachometer and provide a signal for the field effect transistor to turn on the appropriate transistor so that the tachometer winding, which is cutting a flux field at a rate proportional to the shaft velocity, is connected to the output circuit. In the circuit of FIG. 2, use of current switching rather than voltage switching techniques permits the use of field effect transistors 44, 45, 46, and 47 which are relatively low voltage rated field effect transistors and also permits the use of commutation logic 55 which also has a relatively low voltage rating.

The voltage applied to commutation logic 55 may be on the order of 15 volts in the typical embodiment and the field effect transistors are only required to switch a voltage level equivalent to the forward voltage drop across the back-to-back diode or approximately plus or minus 0.7 volts.

Amplifier 51 is an inverting amplifier which is connected to supply voltages +A and −A. In the preferred embodiment, these voltages may be plus or minus 15 volts. If the conventional prior art switching techniques were used, it would be necessary to utilize supply voltages exceeding those which could be expected to be produced by windings W, X, Y, and Z which, in typical applications, might exceed 100 volts.

The output of inverting amplifier 51 is connected to a high voltage non-inverting buffer amplifier 58 which is connected to high voltage supplies +B and −B. In typical applications, these DC voltages might be in the order of plus and minus 100 to 120 volts DC. The output of amplifier 58 is connected to summing junction 50 of amplifier 51 through feedback resistor 60 to give an overall amplifier having low drift and high gain stability. The gain of amplifier 58 is selected such that the low voltage amplifier 51 can adequately drive the output of amplifier 58 to the full range output values desired.

Figure 3A:
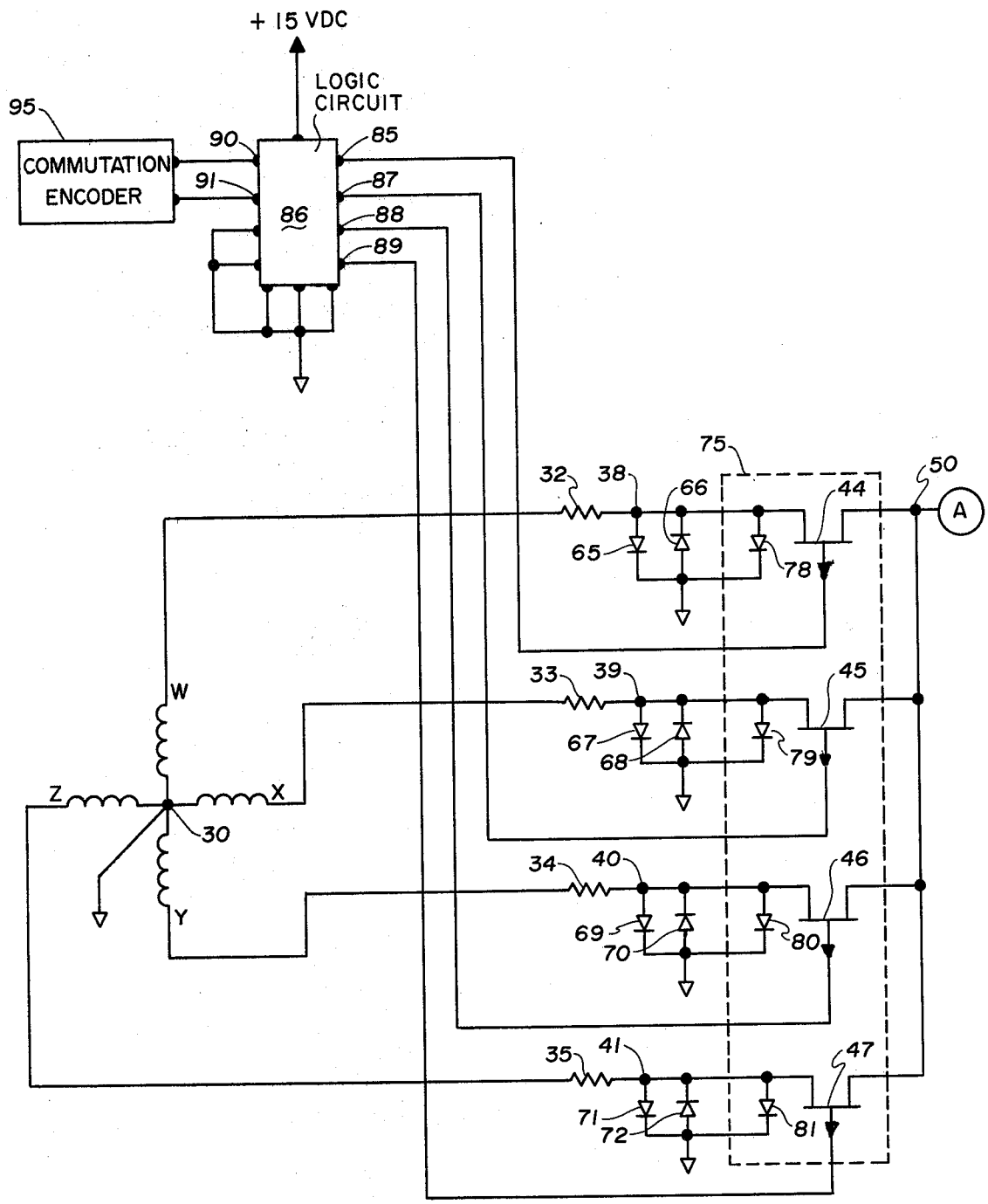
FIG. 3 is a detailed schematic of a preferred embodiment of the present invention.
Figure 3B:
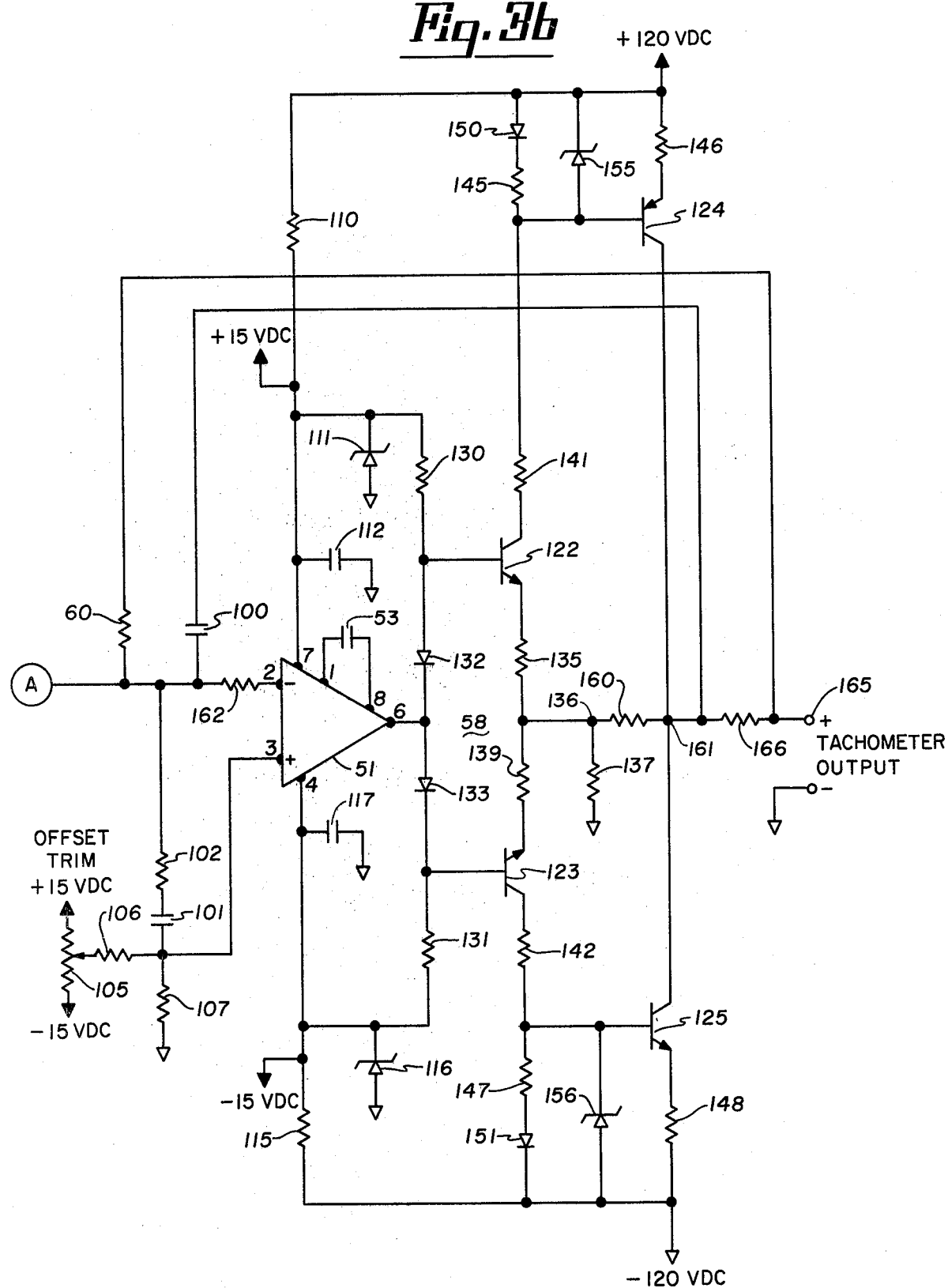
Figure 4:
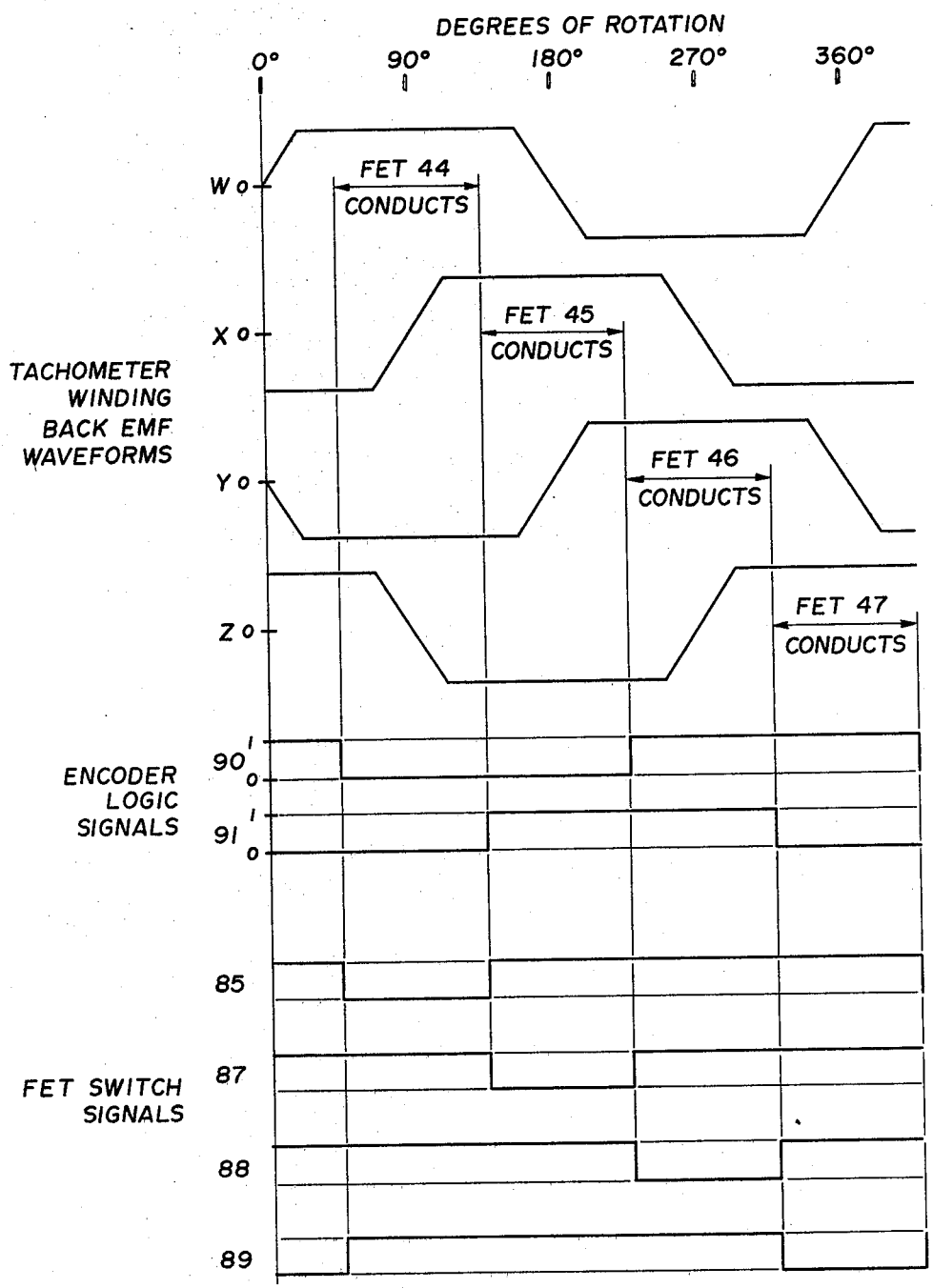
FIG. 4 is a phase diagram showing the various tachometer winding voltages, encoder logic signals, and field effect transistor switch drive signals which appear in the brushless DC tachometer of FIG. 3.

Referring now to FIGS. 3a and 3b, a detailed schematic of the preferred embodiment of the present invention is shown. FIG. 4 shows the phase relationship of some of the voltages present at various points in the circuit of FIG. 3. As was the case in FIG. 2, the brushless tachometer windings W, X, Y, and Z are connected to a common grounded point 30. The waveforms appearing across windings W, X, Y, and Z are shown in FIG. 4 and are trapezoidal waveforms which are shifted in phase by an amount corresponding to the electrical angle between the coils as wound on the stator of the brushless DC tachometer. The height of the trapezoidal waveform is a function of the shaft rotational speed.

Winding W is connected through resistor 32 to node 38 which is connected to the anode and cathode respectively of diodes 65 and 66 which have their respective cathodes and anodes connected directly to ground. In an entirely analogous manner, winding X is connected through resistor 33 to node 39 and thence to ground through diodes 67 and 68; winding Y is connected through resistor 34 to node 40 and thence to ground through diodes 69 and 70 and winding Z is connected through resistor 35 to node 41 and thence to ground through diodes 71 and 72. Nodes 38, 39, 40, and 41 are then connected to input terminals of a four field effect transistor module 75 which is comprised of field effect transistors 44, 45, 46, and 47 which each include internal protective diodes 78, 79, 80, and 81 which have their anodes connected to the field effect transistor terminal and their cathodes connected to ground. Module 75 is an AH5012 field effect transistor module manufactured by National Semiconductor Company.

The other signal terminals of field effect transistors 44, 45, 46, and 47 are connected to summing junction 50. The gate terminal of field effect transistor 44 is connected to terminal 85 of a commutation encoder logic circuit 86 which has its output terminals 87, 88, and 89 connected to the gate terminals of field effect transistors 45, 46, and 47 respectively. Logic circuit 86 is a 4556 two-bit binary "one of four" decoder manufactured by Motorola which receives on its input terminals 90 and 91 the encoder logic signals shown in FIG. 4 and produces on its output terminals 85, 87, 88, and 89 the field effect transistor switch drive signals shown in FIG. 4.

Since field effect transistors 44, 45, 46, and 47 are turned on only by logic "0" signals from circuit 86, it can be seen by examining the signals shown in FIG. 4 that only one field effect transistor switch is "ON" at any time and that each field transistor switch is turned "ON" or "OFF" in accordance with the logic state of the signals at inputs 90 and 91 which are received from a commutation encoder 95. The commutation encoder may be a shaft position encoder mechanically, optically, or otherwise coupled to the tachometer shaft and is used to generate a set of logic signals as shown in FIG. 4 which are delivered to terminals 90 and 91 of circuit 86.

As may be seen from FIG. 4, the phase relationship of the signals delivered to terminals 90 and 91 of circuit 86 is adjusted such that the drive signals from terminals 85, 87, 88, and 89 to field effect transistors 44, 45, 46, and 47 are selected to turn those field effect transistors "ON" so that the winding voltage magnitude of a particular winding is sampled for an increment of shaft position where the winding voltage is a function of the shaft speed only and not the shaft position. This increment occurs during the flattened portion of the respective winding voltage waveform. Resistors 32, 33, 34, and 35 serve as input resistors to inverting operational amplifier 51 and, in the preferred embodiment, have a resistance of 100,000 ohms. Since the summing junction of amplifier 51 is at virtual ground, it can be seen that if one of the FET switches 44, 45, 46, or 47 is "ON," its corresponding input resistor will have a voltage across it which is virtually identical to its respective winding voltage. The input resistors then convert the winding voltages to a current proportional to the winding voltages with a proportionality constant being unity divided by the resistance of 100,000 ohms.

Diodes 65-72 and 78-81 have two functions. First, they prevent the voltage at the input to FETs 44-47 from exceeding approximately plus or minus 0.7 volts from ground to protect the FET switches from damage due to high voltage or undesired turn "ON." Secondly, the diodes provide a continuous path for the tachometer winding current. When FET switch 44, for example, is "ON," the winding current passes through the switch. When FET switch 44 is "OFF," the winding current passes through either diodes 65 and 78 or 66 depending upon the polarity of the induced voltage across tachometer winding W. Since the winding current is never interrupted by the switching, the voltage transient caused by the interaction of inductance of the winding and the rapid change of current is minimized to provide a tachometer output voltage virtually free of switching transients.

Operational amplifier 51 is operated from relatively low voltage plus or minus 15 volt supplies. A feedback resistor 60 is connected to the output 165 of the tachometer circuit so that the gain and drift errors in buffer amplifier 58 will be reduced by the gain of operational amplifier 51 which, in typical commercially available amplifiers such as the LM308H manufactured by National Semiconductor Company used in the preferred embodiment, is 100 db. Feedback capacitor 100 and capacitor 101 and resistor 102, which are connected in series between the inverting and non-inverting inputs of amplifier 51, are used to establish the stability of the overall feedback network. Potentiometer 105 is connected to the non-inverting input of operational amplifier 51 through resistor 106. The non-inverting input of amplifier 51 is grounded through resistor 107. Potentiometer 105 and resistors 106 and 107 are used to provide an adjustable offset voltage trim control for the system.

Resistor 110 is connected at one end to the 120 volt DC supply and at the other end to a 15 volt zener diode 111 which establishes a positive 15 volt DC supply for operational amplifier 15 and for the logic circuit 86. Capacitor 112 is connected between the 15 volt DC point and ground to filter the 15 volt supply. Similarly, resistor 115 is connected between the negative 120 volt DC supply and a 15 volt zener diode 116 which is used to establish the negative 15 volt supply which is filtered by capacitor 117. Capacitor 53 is connected between terminals 1 and 8 of operational amplifier 51. The terminal designations indicated for amplifier 51 correspond to those specified by the manufacturer for the LM308H amplifier.

The output of operational amplifier 51 taken from pin 6 drives the non-inverting buffer amplifier 58 comprised of transistors 122, 123, 124, and 125 plus associated circuitry. In the preferred embodiment, the buffer amplifier 58 is operated with a gain of 33 so that the plus or minus 10 volt maximum output swing from operational amplifier 51 can drive the output of the buffer amplifier to a theoretical maximum of plus or minus 330 volts. The gain of the buffer amplifier, however, may be set to any positive value desired, consistent with the maximum output voltage desired.

Resistor 130 is connected between the positive 15 volt supply and the base of transistor 122 while resistor 131 is connected between the negative 15 volt supply and the base of transistor 123. Resistors 130 and 131 establish the bias current in diodes 132 and 133 such that the voltage drop of diode 132 equals or slightly exceeds the emitter base voltage drop of transistor 122 and the voltage drop of diode 133 equals or slightly exceeds the emitter base voltage drop of transistor 123. This bias arrangement has the effect of reducing amplifier crossover distortion.

The emitter of transistor 122 is connected through a resistor 135 to a node 136 which is connected to ground through a further resistor 137. The emitter of transistor 123 is connected to node 136 through a resistor 139. Transistors 122 and 123 are current sources whose collector currents are proportional to the difference between the drive voltage at the output of amplifier 51 and the feedback voltage at node 136. Resistors 135 and 139 are emitter ballast resistors used for bias current stabilization. The collector of transistor 122 is connected to a dropping resistor 141. The collector of transistor 123 is connected to a dropping resistor 142. Dropping resistors 141 and 142 prevent undue power dissipation in transistors 122 and 123.

Output transistors 124 and 125 are also configured as current sources whose collector currents are proportional to the collector currents of transistors 122 and 123 respectively. The collector currents of transistors 124 and 125 are greater than the collector currents of transistors 122 and 123 by the ratio of the resistance of resistor 145 to resistor 146 and resistor 147 to resistor 148 respectively. Resistor 145 is connected between resistor 141 and the cathode of diode 150 whose anode is connected to the 120 volt supply. Resistor 146 is connected between the emitter of transistor 124 and the 120 volt supply. Resistor 147 is connected between resistor 142 and the anode of diode 151 whose cathode is connected to the minus 120 volt supply. Resistor 148 is connected between the emitter of transistor 125 and the minus 120 volt supply.

Zener diode 155 is connected between the base of transistor 124 and the 120 volt supply and zener diode 156 is connected between the base of transistors 125 and the minus 120 volt supply. Diodes 155 and 156 are used to match the emitter base voltage drops of transistors 124 and 125 respectively, thus reducing crossover distortion at the output of amplifier 58. Zener diodes 155 and 156, which in the preferred embodiment have a breakdown value of 5.1 volts, are, under normal operating conditions, in a nonconducting state. Diodes 155 and 156 conduct when the collector current of transistors 124 and 125 exceeds a predetermined value so that the zener diodes function as current limiters by clamping the base voltages of transistors 124 and 125 to predetermined values thereby limiting the maximum output current to a predetermined value and protecting output transistors 124 and 125.

Node 136 is connected through a resistor 160 to a node 161 which is also connected to the collectors of transistors 124 and 125. Node 161 is also connected through capacitor 100 to summing junction 50, which is connected to the input at pin 2 of operational amplifier 51 through a further resistor 162. Node 161 is connected to the tachometer output terminal 165 through resistor 166.

Tachometer output terminal 165 is connected through feedback resistor 60 to summing junction 50. Resistor 166 is used to maintain amplifier stability for large capacitive loads. Resistors 160 and 137 form a local feedback network from the output to the input of buffer amplifier 58 which helps to stabilize the gain and drift. Buffer amplifier 58 is a closed loop non-inverting amplifier having its gain determined by the ratio of the sum of the resistance of resistor 137 and the resistance of resistor 160 divided by the resistance of resistor 137. In the preferred embodiment, the amplifier is limited to an output current of plus or minus 24 milliamperes.

The overall closed loop gain of the tachometer amplifier is equal to the ratio of the resistance of feedback resistor 60 to the resistance of resistor 32 for the portion of the operating cycle where the voltage is derived from winding W. In the preferred embodiment, the resistance of resistors 32, 33, 34, and 35 is equal and both those resistors and feedback resistor 60 were set at 100 K ohms.

Because of the unique switching arrangement utilized in the present invention, only transistors 122, 123, 124, and 125 and capacitor 100 need be rated to withstand the plus or minus 120 volt drive voltage. All other components have low voltage ratings.

It will, of course, be understood that various changes may be made in the form, details, arrangement, and proportions of the parts without departing of the scope of the invention which consists of the matter shown and described herein and set forth in the appended claims.

What I claim is:

1. A brushless tachometer providing a DC output voltage proportional to the rotational speed of a shaft, comprising:
    amplifier means having an input summing junction and an output terminal;
    means for generating a magnetic field rotatable with said shaft;
    a plurality of coils positioned about said shaft for engagement by said magnetic field as said shaft is rotated, one end of each of said coils being connected to a source of reference potential;
    a plurality of switching devices each of which has a first switching terminal connected to said summing junction of said amplifier and each of which has a second switching terminal and a control terminal;
    a plurality of resistance means, each of which is connected between the other end of one of said coils and one of said second switching terminals of one of said switching devices;
    a plurality of pairs of unidirectional current conducting and voltage offset devices connected between said second switching terminal of each of said switching devices and said source of reference potential; and
    commutation means for sensing the angular position of said shaft and providing control signals to each of said control terminals of each of said plurality of switching devices for rendering said switching devices conductive for a portion of one revolution of said shaft during which time the voltage across said coil is proportional to the rotational speed of said shaft such that the signal at the output terminal of said DC amplifier means is proportional to the rotational speed of said shaft.

2. A tachometer as set forth in claim 1 in which said switching devices are field effect transistors.

3. A tachometer as set forth in claim 1 in which each of said unidirectional current conducting and voltage offset devices is a semiconductor diode.

4. A tachometer as set forth in claim 1 in which said amplifier means comprises an operational amplifier portion driven by a low voltage power supply and a buffer amplifier portion connected to the output of said operational amplifier and powered by a high voltage DC power supply, said amplifier including feedback means from the buffer amplifier output terminal to said input summing junction.

5. A tachometer as set forth in claim 1 wherein said plurality of coils comprises at least four coils separated by substantially equal electrical angles around said shaft.

6. In a brushless tachometer for providing a DC output voltage proportional to the rotational speed of a shaft including DC magnet means rotatable with said shaft and a plurality of tachometer stator coils positioned about said shaft and positioned to cut magnetic flux lines of said magnet, current switching means for commutating said coils without substantially changing the flow of current in said coils comprising:
    a plurality of resistors connected in series with said coils;
    a plurality of switching means connected between said coils and a summing junction of a DC amplifier;
    at least one grounded anode diode connected to form a current path between the coil side of said switch and ground; and
    at least one grounded cathode diode connected to form a current path between the coil side of said switch and ground.

* * * * *